United States Patent [19]

Blake et al.

[11] Patent Number: 5,451,777

[45] Date of Patent: Sep. 19, 1995

[54] SCANNING APPARATUS WITH SELF-PROPELLED LINEAR MOTION CARRIAGE

[75] Inventors: Lawrence S. Blake, Peabody; Arthur J. Bellemore, Chelmsford; Ralph S. Hanseler, North Andover; David P. Viola, Andover, all of Mass.

[73] Assignee: Miles Inc., Wilmington, Mass.

[21] Appl. No.: 182,488

[22] Filed: Jan. 14, 1994

[51] Int. Cl.6 ............................................. H04N 1/22
[52] U.S. Cl. ...................... 250/234; 358/482; 358/491
[58] Field of Search ............... 250/234, 235, 236; 358/482, 483, 490, 491

[56] References Cited

U.S. PATENT DOCUMENTS

| 1,746,407 | 2/1930 | Schröter et al. |
|---|---|---|
| 3,875,587 | 4/1975 | Pugsley . |
| 4,444,069 | 4/1984 | Dangschat . |
| 4,687,352 | 8/1987 | Igi et al. ........................ 250/234 |
| 4,816,847 | 3/1989 | Pavone . |
| 4,963,217 | 10/1990 | Pavone . |
| 5,182,450 | 1/1993 | Pan ............................... 250/234 |
| 5,289,000 | 2/1994 | Toyofuku ....................... 250/234 |
| 5,297,880 | 3/1994 | Kawanishi et al. ............ 250/234 |
| 5,311,015 | 5/1994 | Takeuchi ....................... 250/234 |

FOREIGN PATENT DOCUMENTS 1185115  3/1970  United Kingdom .

*Primary Examiner*—David C. Nelms
*Assistant Examiner*—John R. Lee
*Attorney, Agent, or Firm*—Julie A. Krolikowski

[57] ABSTRACT

A scanning apparatus is disclosed in an imagesetter with an internal drum recording surface, having an improved carriage system which is self-propelled and carries scanning optics for recording an image including a spin motor/mirror, a laser diode, and a focusing lens. The drive system is mounted to the carriage to allow the carriage to move linearly inside the drum as a self-propelled direct drive. An electronic control device mounted on the carriage provides precision motion control of the carriage.

28 Claims, 6 Drawing Sheets

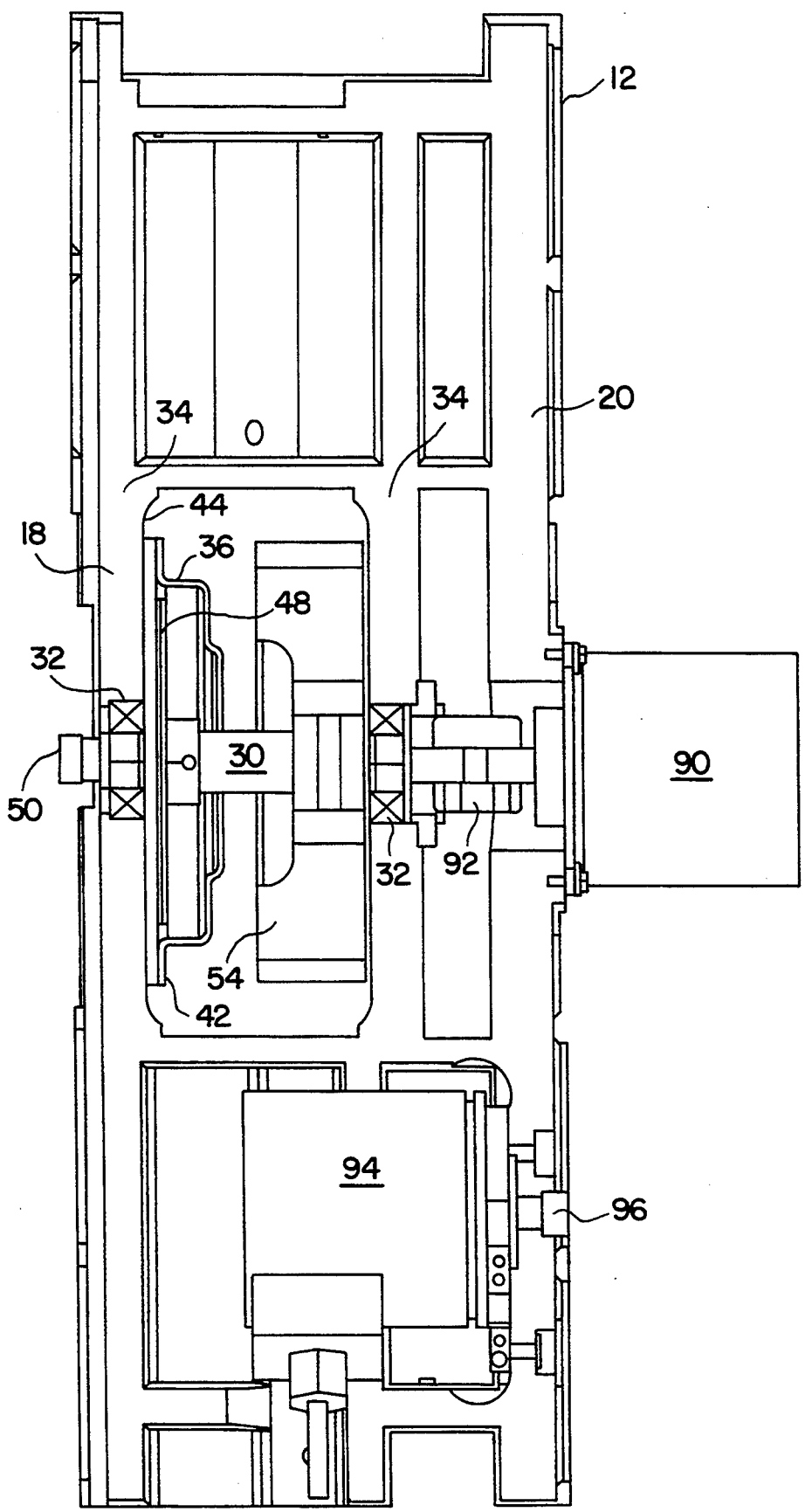
F I G. 3

SCANNING APPARATUS WITH SELF-PROPELLED LINEAR MOTION CARRIAGE

This application is related to application of Lawrence S. Blake, Arthur J. Bellemore, Ralph S. Hanseler and David P. Viola for Self-Propelled Linear Motion Drive Apparatus, Ser. No. 08,182,484 filed on Jan. 14, 1994 and application of David P. Viola and Lawrence S. Blake for Support For A Self-Propelled Linear Motion Drive Apparatus, Ser. No. 08/182,602 filed on Jan. 14, 1994.

BACKGROUND OF THE INVENTION

The present invention relates to an apparatus for scanning an object to be scanned with a radiation beam. Such an apparatus may be used to record an image on an image recording substrate or probe for information about an image or object to be scanned by collecting energy from the object with a radiation detector.

The present invention particularly relates to a scanning apparatus having a scanning beam deflector for scanning a beam along a scan axis, and a movable carriage, movable along a motion axis for moving the scanning beam deflector continuously or incrementally along the motion axis. Such a beam deflector apparatus may be characterized e.g. by a rotating mirror being rotated about a rotation axis by a spinner motor. An input beam incident to the rotating mirror is reflected radially away from the mirror in a sweeping scan motion such that a region of an object to be scanned is traversed by the rotating mirror output beam. The introduction of linear motion to the rotating mirror and spinner motor attached to the movable carriage provides for scanning the object to be scanned in two dimensions with a series of scans.

In addition to a radiation beam deflector and movable carriage, a scanning apparatus typically comprises a radiation source for generating an incident beam, input optics for shaping the incident beam, output optics for shaping the output beam, a linear drive apparatus for moving and guiding the carriage along the motion axis, a driver and controller for driving the scanning and carriage motions in synchronization and a master controller for sending receiving and or storing scan data.

Scanning apparatuses at least date back to 1928 when Schroter et at. in U.S. Pat. No. 1,746,407 showed an internal drum scanner having a thin walled partial cylinder for holding an object to be scanned against it's inner circumferential surface. Beam scanning is provided by rotating optical element, rotating about the cylinder longitudinal axis which reflects an incident beam directed along the cylinder longitudinal axis radially outward toward the object to be scanned. The internal drum provides a scan surface having constant radial distance from the rotation axis such that a lens placed in the beam path either before or after the beam deflector can be used to focus the beam energy to a fine spot at the surface of the object to be scanned.

In the Schroter embodiment, the entire drum and object to be scanned are mounted to a movable carriage and are traversed along a linear motion axis parallel to the longitudinal axis of the drum, moving the object to be scanned past the rotating optical element which remains in a fixed position with respect to the motion axis. This embodiment requires moving the drum over the entire scan length necessitating a scanning apparatus which is substantially longer that the object to be scanned adding significant cost to the structural support and enclosure elements and presenting substantial difficulties in supporting and balancing the rotating elements when long scan lengths are considered. Furthermore, the friction slide and lead screw linear drive apparatus require a high torque drive motor. These elements add cost which increases with scan length and improved motion precision requirements.

Pugsley in U.S. Pat. No. 3,875,587 and Matsushita in GB Pat. No. 1,185,115 each teach the improvement of suspending a movable carriage within an internal drum and mounting a rotating optical element, spin motor and spin motor encoder on the carriage for linear motion within the drum. In this embodiment, the drum and object to be scanned remain stationary while the more compact carriage and beam deflector elements are moved linearly. This embodiment reduces the mass of the moving elements thereby reducing friction allowing smaller, less costly linear motion elements to be employed.

In the Pugsley and Matsushita embodiments the overall length of the scanning apparatus may be reduced by translating the smaller carriage and beam deflector elements instead of the larger drum. However, the apparatus length still exceeds the scan length due to the need for mounting a radiation source and linear drive components outside the linear travel range of the carriage. The added apparatus length for components outside the linear travel range of the carriage adds cost to structural and enclosure elements and may cause the apparatus be prohibitively long, reaching weight and floor space limits for office and light industrial equipment standards when very large objects, e.g. newspaper pages, are to be scanned.

It is accordingly, a general object of the present invention to provide an improved scanning apparatus with reduced cost and weight and with an apparatus length substantially equal to the scan length of the object to be scanned.

It is a specific object of the present invention to provide a scanning apparatus having a self-propelled movable carriage.

It is a further object of the present invention to provide a scanning apparatus having a self-propelled movable carriage with attached radiation source, beam deflector and scanner diver and controller for synchronizing scan and linear motions.

SUMMARY OF THE INVENTION

An apparatus for scanning an object to be scanned with a radiation beam comprises a movable carriage for movement along a linear motion axis relative to the object to be scanned. A linear motion drive apparatus is carded by the movable carriage and drives the movable carriage along the linear motion axis. An electro-magnetic radiation source is also carried by the movable carriage means and generates the radiation beam. The beam is scanned by a radiation beam scanning system carried by said movable carriage, along a path defining a scan line on the object to be scanned. An electronic controller is in communication with the linear motion drive to drive said movable carriage along the linear motion axis in synchronization with the radiation beam scanning system wherein the object to be scanned is scanned by a plurality of substantially uniformly spaced scan lines.

BRIEF DESCRIPTION OF THE DRAWINGS

The features and objects of the present invention will become apparent in the following description when taken with the accompanying drawings, in which:

FIG. 3 is a bottom view of the self-propelled carriage apparatus according to the present invention;

DETAILED DESCRIPTION OF THE INVENTION

Figure 1:
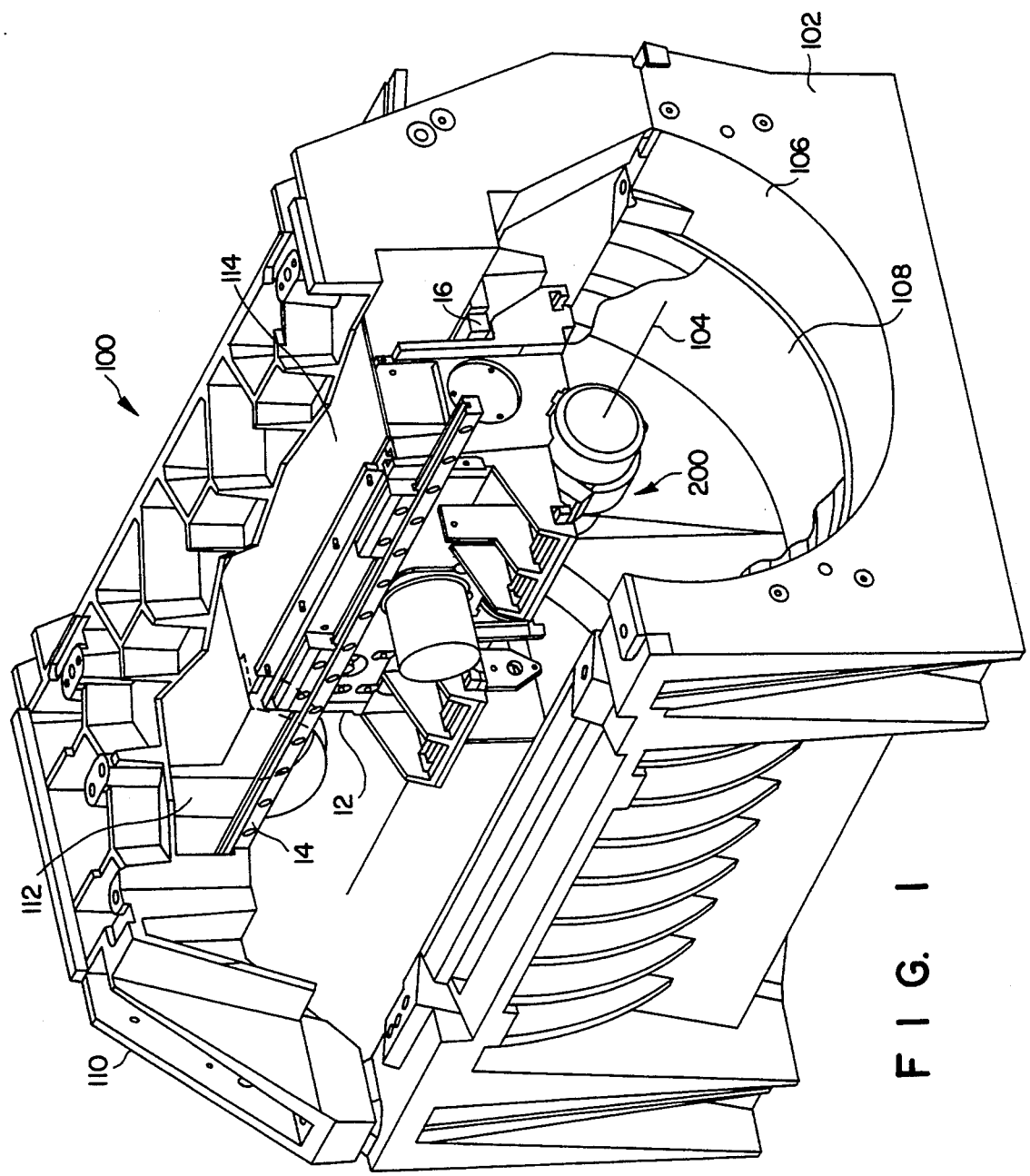
FIG. 1 is an isometric view showing a portion of an internal drum scanner apparatus according to the present invention.

Referring now to FIG. 1, a scanning apparatus generally indicated by reference numeral 100 comprises an internal drum 102 in the form of a partial cylinder having a longitudinal axis 104 and a support surface 106 on which an object to be scanned 108 is secured for scanning. The drum 102 further serves as a structural base, supporting an upper support structure 110. A movable carriage 12, movably suspended by support and guide rails 14 and 16, attached to upper structure 110, moves along a linear motion axis defined by the rails 14, 16, which are made parallel with drum axis 104 by alignment of upper structure 110 with drum 102 at assembly. A wire harness 112, connects at its first end to the carriage 12 and at its other end to a scanner controller (not shown) for supplying electrical power to electronic components attached to the carriage 12 and for passing electronic signals between electronic components attached to the carriage 12 and the scanner controller. The wire harness 112 moves with the carriage 12 being fully extended at the first end of travel of the carriage 12 and forming a slack loop when carriage 12 is at the other end of travel.

Figure 2:
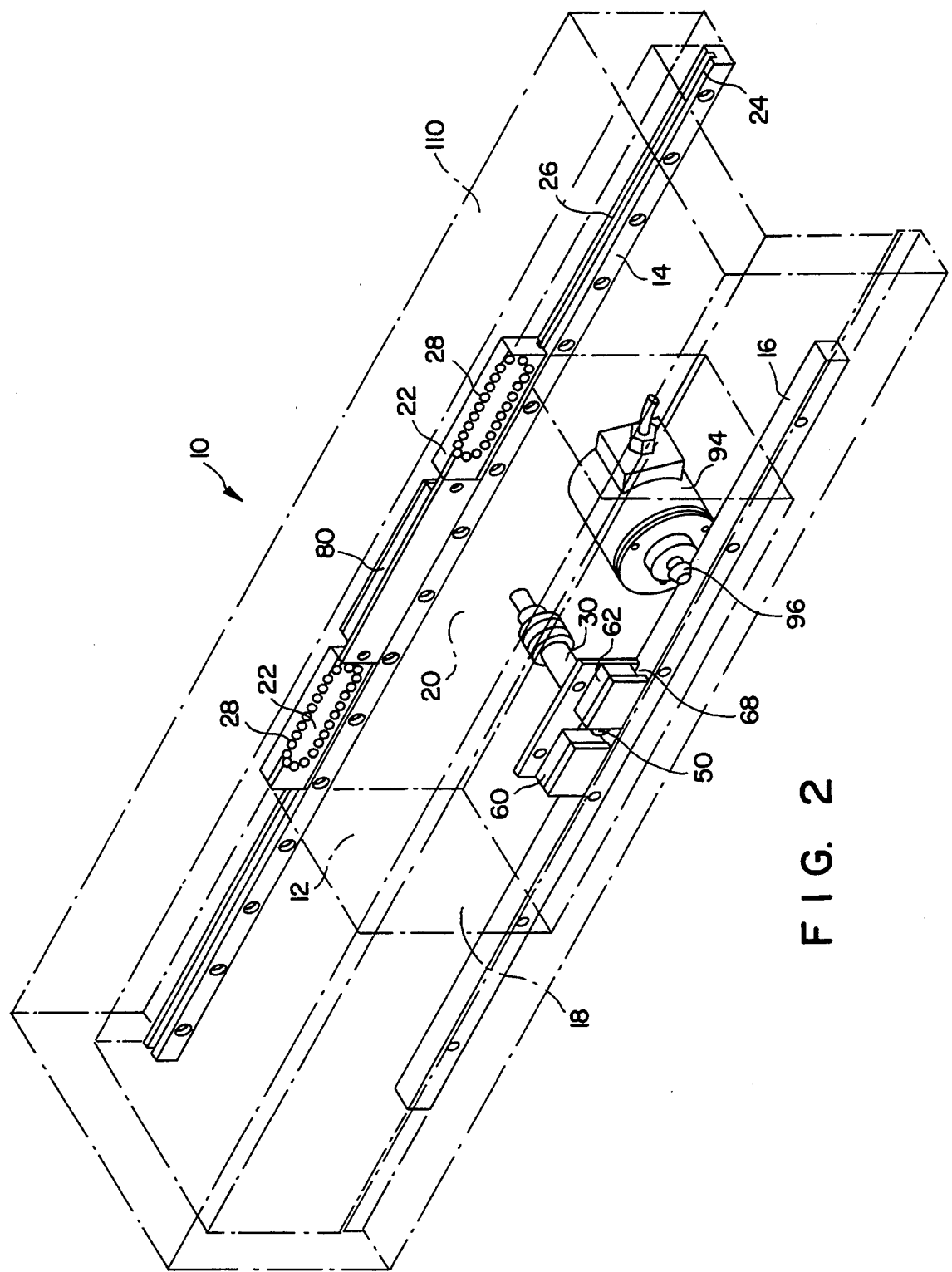
FIG. 2 is an isometric view of guide and support elements along which a self-propelled carriage of FIG. 1 is propelled.

Referring now to FIG. 2, a linear motion drive apparatus, generally indicated by reference numeral 10, drives the carriage 12 (shown dashed) along the two guide rails 14, 16 supported over their entire length by the upper support structure 110 (shown dashed). The carriage 12, generally rectangular in form, has guide rail 16 along longitudinal side wall 18 and guide rail 14 along longitudinal side wall 20 of the carriage 12 to provide stabilization. The carriage 12 is supported for linear movement along the guide rails 14, 16 by two recirculating ball bearings 22 that allow the carriage 12 to move along the rails with minimal friction. Rail 14 has a V-groove 24 in a top side 26 thereof to accommodate balls 28 of the recirculating ball bearings 22. The bearings 22 are attached to the exterior of the side wall 20 of the carriage 12 and are spaced apart along the V-grooved rail 14 to prevent rotation of the carriage 12 relative to the guide rails 14, 16. The low friction rolling contact interface of the carriage with the support and guide rails of the present invention allows smooth uniform carriage motion substantially reducing the drive torque required to move the carriage along the motion axis when compared with the lead screw and friction slide linear drives of the prior art.

Shown in FIG. 3, a drive shaft 30 is supported for rotation by two ball bearings 32 mounted in interior walls 34 of the carriage 12. A "pancake" DC motor 36 is mounted on the carriage 12 to rotate the drive shaft 30. Near one end of the drive shaft 30, a stator motor housing 42 is fixed to an inner portion 44 of the side wall 18, and a rotor 48 is fixed to the drive shaft 30 for rotation therewith. Integral with the same end of the drive shaft 30 is a friction wheel 50 in contact with the flat rail 16, to drive the carriage 12 along the rails 14, 16 upon rotation of the drive shaft 30. Near the center of the drive shaft 30, an inertia wheel 54 is fixed to the drive shaft 30 for rotation therewith to provide rotational inertia and to minimize carriage velocity disturbances due to possible motor torque ripple and transport friction variations.

Figure 4:
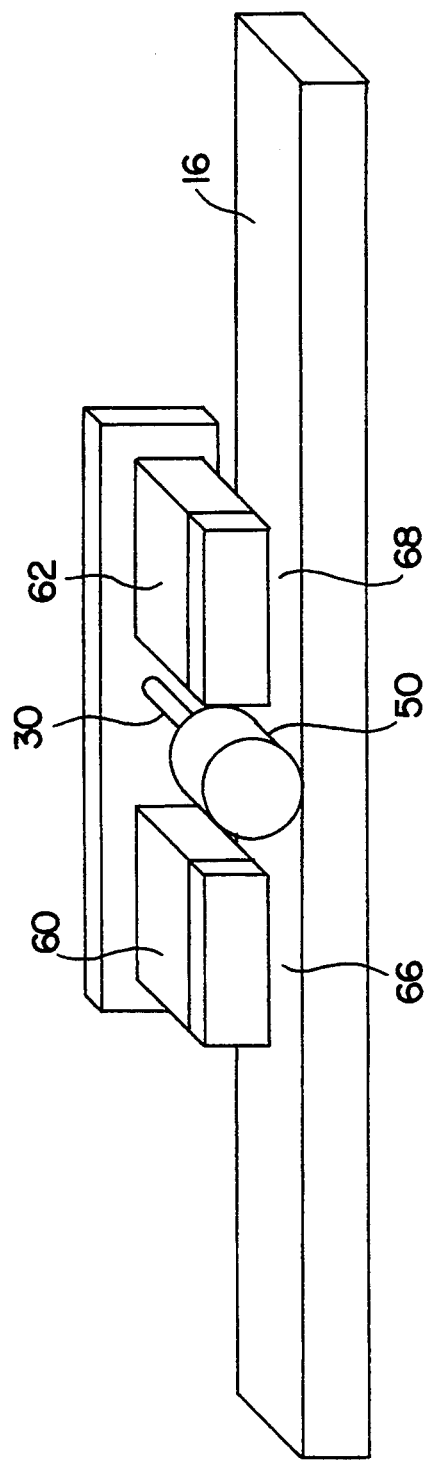
FIG. 4 is a diagrammatic view showing magnetic loading elements of the carriage of FIG. 2 against support guide elements of FIG. 3.

Referring now to FIGS. 2 and 4, two permanent magnets 60, 62 are fixed to an outer portion of the side wall 18 of the cartage 12, one on each side of the friction wheel 50. Air gaps 66, 68 are located between each magnet 60, 62 respectively, and the flat rail 16, which can have a ferromagnetic member integral therewith or can be constructed of ferromagnetic material. A magnetic attraction between the magnets 60, 62 and the flat rail 16 urges the friction wheel 50 into frictional engagement with the flat rail 16, providing a firm contact between the friction wheel 50 and the flat rail 16, thereby minimizing slip. Additionally, frictional contact is maintained between the friction wheel 50 and the flat rail 16 by the gravity load of the cartage 12 when mounted as in FIG. 1, however the gravity load is small compared to the magnetic force, and the magnetic loading is sufficient to enable vertical mounting and linear movement in addition to horizontal.

Referring now to FIG. 2, on the opposite side wall 20 of the cartage 12, a large magnet 80 is interposed between the two spaced recirculating ball bearings 22. An air gap (not shown) is located between the large magnet 80 and the V-grooved rail 14, which also has a ferromagnetic portion like the flat rail as described in the preceding paragraph. The air gap is substantially identical to the air gaps 66, 68 for the magnets 60, 62 shown and described for the flat rail 16 mounting. The large magnet 80 urges the recirculating ball beatings 22 into the V-grooved rail 14. The magnitude of the magnetic load between the magnets 60, 62 and 80 and the rails 14, 16 can be adjusted by changing the width of the air gap by adjusting the mounting position of each magnet with respect to the carriage wall 18 or 20.

Figure 5:
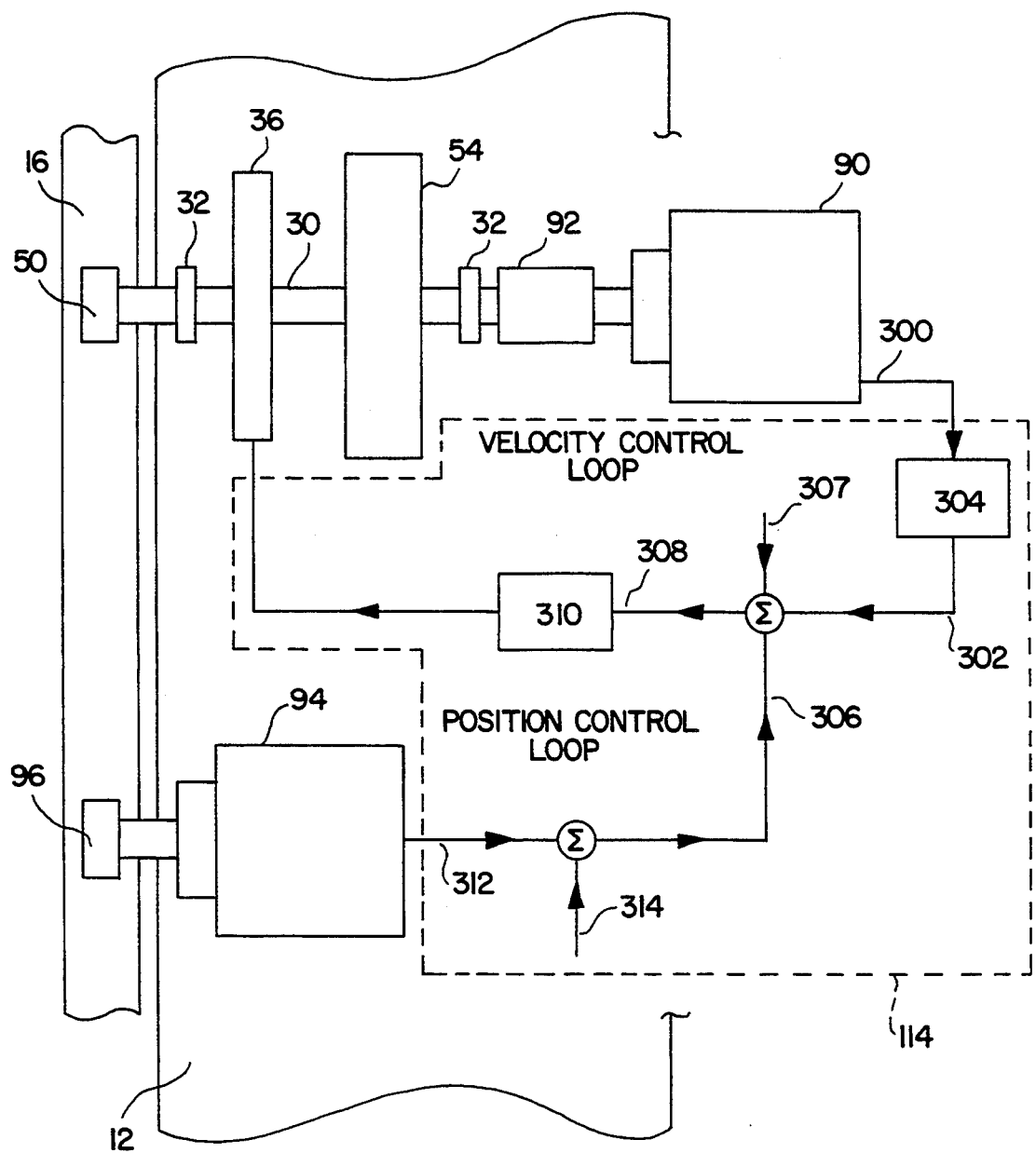
FIG. 5 is a diagrammatic view of a control system employed by the present invention; and, FIG. 6 is an isometric view of an optical scanning apparatus mounted to the carriage of FIG. 2.

Referring now to FIG. 5, a first precision rotary encoder 90 is directly coupled to drive shaft 30 via coupling 92 and generates an electrical signal 300 representative of the angular position of the DC motor 36 as well as attached drive shaft 30 and friction wheel 50. A motor driver controller PC board 114 attached to the cartage 12 is an integral part of a conventional velocity control loop for monitoring and correcting the angular velocity of DC motor 36. The controller board 114 receives the electrical signal 300 from the first encoder 90 for processing at signal processor 304. The signal 300 from the first encoder 90 is converted from a position signal to velocity signal 302 proportional to the carriage velocity by the signal processor 304. Velocity signal 302 is then summed with a position error signal 306, as well as with a desired velocity signal 307, both described below, forming an error velocity signal 308 which is amplified by power amplifier 310 which in turn accelerates or decelerates the DC motor 36 in a manner that minimizes the velocity error of the DC motor 36 in accordance with the error velocity signal 308

A second rotary encoder 94 is mounted to the carriage 12 and has a wheel 96 riding along one of the rails 14, 16. The second encoder 94 generates an electrical signal 312 representative of the angular position of wheel 96 with respect to the rails 14, 16. The signal 312 from the second encoder 94 is processed by controller board 114 such that a conventional position control loop for monitoring and correcting the angular position of DC motor 36 with respect to a desired angular position is provided. The controller board 114 receives the electrical signal 312 from the second encoder 94 and sums it with a desired position signal 314 which is derived from the position of a third encoder, to be described in a later section, but could be any desired position signal. The position signal 314 may be time varying, in which case the position loop, effectively becomes a phase lock loop. The resultant sum provides the position error signal 306 which modifies the velocity of DC motor 36 as described above.

By continuous sampling of the encoder signals 300 and 312, controller board 114 continually compensates for velocity and position errors of the carriage 12 with respect to the rails 14, 16.

The second rotary encoder 94 is shown with its wheel 96 mounted against the flat rail 16 in FIG. 2 and with its wheel 96 is facing the opposite side 20 of the carriage 12 for mounting against the V-grooved rail 14 in FIG. 3. It is noted that the wheel 96 of the second encoder 94 can be mounted to ride along either of the two guide rails 14, 16 or along any stationary surface to track the actual movement of the carriage 12 along any fixed base.

The described self-propelled drive system does not require the use of two rotary encoder 90 and 94, since the single encoder 90 can be used to provide both position and velocity feedback. It is possible to provide a combined velocity and position control loop from a single encoder signal. The present embodiment offers the advantage that, micro-slip, which is known to occur in friction drives between friction drive wheel 50 and rail 16, is compensated for by monitoring the actual position with the encoder 94 and its wheel 96. Furthermore, the carriage 12 can be guided and supported by equivalent means other than those shown in the present embodiment or to substitute equivalent position feedback devices, e.g. a linear encoder or inter-ferometric device, for encoder 94 to measure the actual linear position of the carriage 12 with respected to a stationary fixed base.

Figure 6:
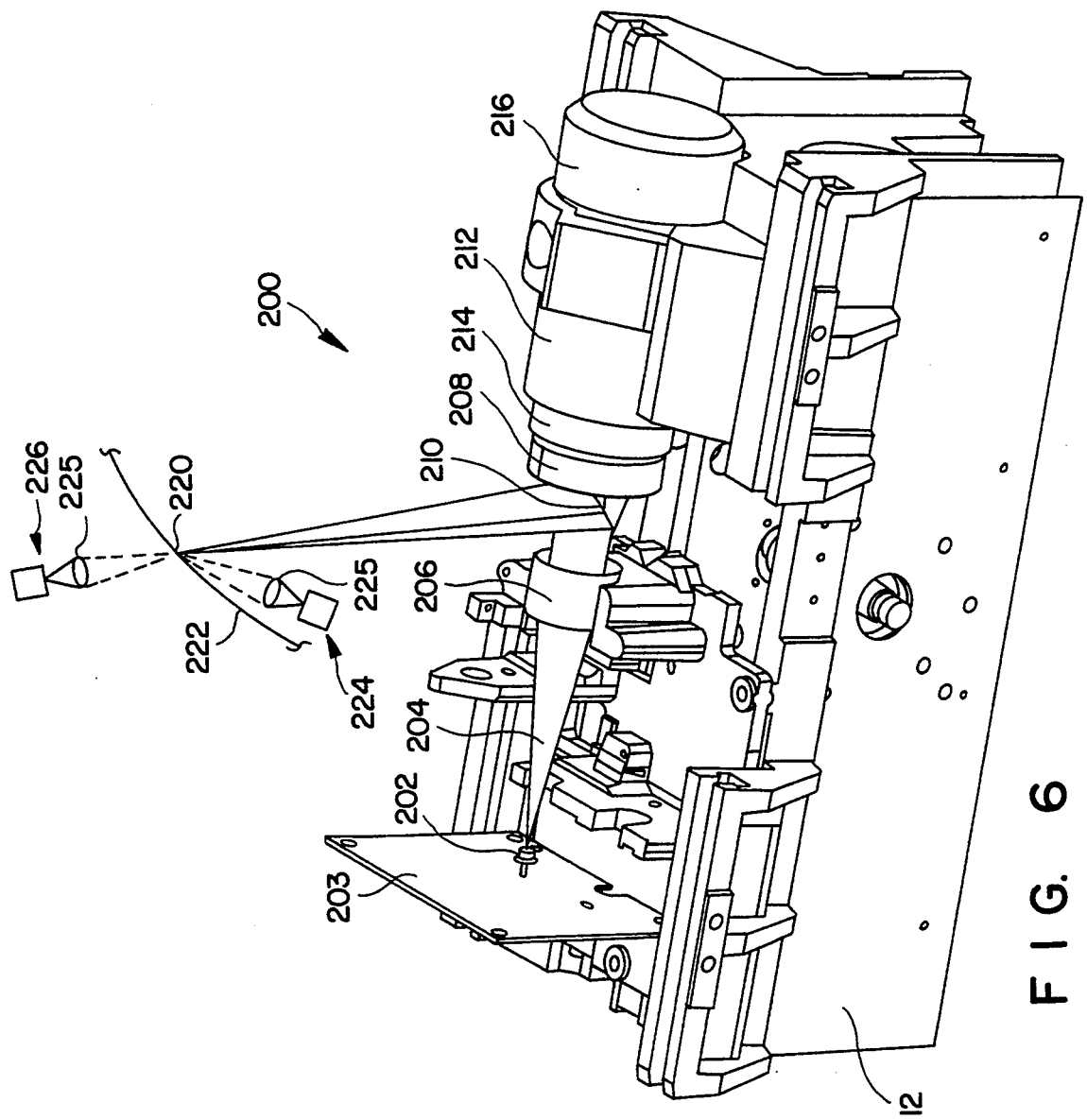

Referring now to FIG. 6, a radiation beam scanning apparatus, indicated generally by reference numeral 200 is attached to the carriage 12. A beam scanning apparatus in general, only requires a radiation beam source and a rotating deflector element to perform a scanning function i.e. to deflect a radiation beam through a range of angles in a sweeping motion. In this embodiment of the invention, the radiation beam scanning apparatus 200 is specifically for scanning an image to be recorded. A laser diode 202 which is controlled and driven by a laser current driver PC board 203 provides a point electromagnetic radiation source for generating a diverging beam 204. The laser diode 202 and laser driver board 203 are each attached to the carriage 12 and the driver 203 is in communication with the motor driver controller board 114 (FIG. 1) for sending and receiving electrical signals. The laser driver board 203 provides a driver current for driving and modulating the laser diode 202 in synchronization with the motion of the carriage 12, and in accordance with an information signal, described in a later section.

The beam 204 is collected and shaped by a lens 206 while passing therethrough to a spin mirror 208 which reflects the beam through a substantially 85° angle toward the surface of the object 108 (FIG. 1) to be scanned at the surface of the drum 102. The lens 206 focuses the diverging beam 204 to a fine spot at the surface of the object 108 to be scanned, which in a preferred embodiment of the invention, is an image recording substrate such as photosensitive recording media like film, paper or plate material, and upon which an image is recorded by the radiation beam scanning apparatus.

It will be appreciated that the configuration of the lens 206 being positioned between the radiation beam source 202 and the rotating reflector 210 produces a curved field scan. Alternatively, the lens 206 can be positioned between the rotating deflector and the scanned object 108 to produce a flat field scan line. In this case, the object 108 is positioned on a flat supporting surface (not shown).

In an alternative embodiment when a radiation beam scanning apparatus is used for probing an object to be scanned to determine some characteristic of the object by collecting energy reflected from or energy which passes through the object to be scanned, a radiation beam detector is placed in a position for collecting some of the energy reflecting from or passing through the scanned object. Although such an embodiment is more typically used in a flat field scanning apparatus, FIG. 6 diagramatically details a radiation beam detector 224 for collecting energy reflected from an object to be scanned, and radiation beam deflector 226 for collecting energy passing through an object to be scanned. In each case lens 225 collects energy to focus it onto the surface of the radiation detectors 224, 226. It will be appreciated that detectors 224, 226 could replaced by an image recording material responsive to a radiation beam such that an image representative of the object to be scanned is recorded.

The spin mirror 208 provides a planar reflective surface 210, for reflecting the beam 204, and is attached to spin motor 212 at the first end of a motor shaft 214, for rotation thereby. A precision rotary encoder 216 attaches to the second end of shaft 214 for providing an electrical signal representative of the angular position of shaft 214 and the attached spin mirror 208. The signal from encoder 216 is received by the controller board 114 and is scaled to generate the desired position signal 314 thereby synchronizing the spinner angular position with the position of carriage 12.

The optical scanning apparatus 200 provides a focused laser spot 220 at the surface of the object 108 to be scanned. The laser spot 220 has a substantially round shape and a diameter which is a function of the laser diode 202 and the lens 206. Upon rotation of the spin mirror 208, the focused spot 204 sweeps out a scan line 222, substantially perpendicular to the axis of rotation of the mirror 208. By adjustment of the position of spin motor 212 with respect to rails 14, 16 at assembly, the rotation axis of spin mirror 208 is located substantially coincident with the longitudinal axis 104 of the drum 102 and substantially parallel with the travel axis of carriage 12. This provides that the scan line 222 is essentially perpendicular to the drum axis 104.

By translating the carriage 12 along the rails 14, 16 at a rate substantially equivalent to one diameter of laser spot 220 per revolution of spin mirror 208, a two dimensional scan of the object to be scanned 108 is provided at a resolution substantially equal to the diameter of spot 220. As described above, the synchronization of the spin motor 212, the DC motor 36 and any modulation of the laser diode 202 is maintained by the driver controller board 114 which is mounted on the carriage 12.

The laser diode 202 and thus the laser spot 220 are modulated in accordance with an information signal representing an image to be recorded onto the image recording substrate of the object to be scanned 108. The beam energy is modulated above and below a recording energy threshold of the image recording substrate in order to record an image pixel when the beam energy is above the recording energy threshold, and to not record an image pixel when the beam energy is below the recording energy threshold. The modulation is controlled through the driver controller board 114 which receives the information signal for modulation by convention means.

While this invention has been described in terms of various preferred embodiments, those skilled in the art will appreciate that various modifications, substitutions, omissions and changes may be made without departing from the spirit thereof including the use of any radiation scanning device for scanning any form of object to be scanned. Accordingly, it is intended that the scope of the present invention be limited solely by the scope of the following claims, including equivalents thereof.

What we claim and desire to secure by Letters of Patent of the United States are the following:

1. An apparatus for scanning an object to be scanned with a radiation beam, comprising:
   (a) movable carriage means for movement along a linear motion axis, said linear motion axis having a known relationship with said object to be scanned;
   (b) linear motion drive means, carried by said movable carriage means, for moving said movable carriage along said linear motion axis;
   (c) an electro-magnetic radiation source means, at least a portion of which is carried by said movable carriage means, for generating said radiation beam;
   (d) radiation beam scanning means, carried by said movable carriage means, for scanning said radiation beam along a path defining a scan line said scan line having a known relationship with said object to be scanned; and,
   (e) electronic controller means, in communication with linear motion drive means, for moving said movable carriage means along said linear motion axis in synchronization with said radiation beam scanning means wherein said object to be scanned is scanned by a plurality of substantially uniformly spaced scan lines.

2. The apparatus of claim 1 wherein at least portion of said radiation beam is reflected from a surface of said object to be scanned and wherein the reflected energy is used to provide information about of said object to be scanned.

3. The apparatus of claim 1 wherein at least a portion of said radiation beam passes through said object to be scanned and wherein the energy which passes through said object to be scanned is used to provide information about said object to be scanned.

4. The apparatus of claims 2 or 3 further comprising radiation detection means, carried by said movable carriage means, for receiving radiation energy from said object to be scanned and for generating an electrical signal in response to said radiation energy from said object to be scanned.

5. The apparatus of claims 2 or 3 further comprising an image recording substrate for recording an image in response to receiving radiation energy from said object to be scanned.

6. The apparatus of claim 1 further comprising means for modulating the energy of said radiation beam.

7. The apparatus of claim 6 wherein said means for modulating the energy of said radiation beam modulates said beam energy in accordance with an information signal representing an image to be recorded and wherein said object to be scanned is an image recording substrate for recording an image in response to the modulation of said radiation beam.

8. The apparatus of claim 1 wherein said electro-magnetic radiation source means comprises a laser.

9. The apparatus of claim 8 wherein said laser includes a semiconductor laser diode and wherein said means for modulating the energy of said radiation beam includes a semiconductor laser diode driver and wherein said semiconductor laser diode and said semiconductor laser diode driver are carried by said movable carriage means.

10. The apparatus of claim 1 further comprising at least one optical element, carded by said movable carriage means, for defining the energy distribution of said radiation beam, at a particular surface of said object to be scanned.

11. The apparatus of claim 10 wherein said at least one optical element is a lens positioned in the path of said radiation beam and said radiation beam scanning means is a rotating optical element, rotating about a rotation axis, and wherein said lens is positioned between said radiation beam source and said rotating optical element such that said radiation beam passes through said lens and is scanned by said rotating optical element such that a scan line is defined by the focused radiation beam formed by said lens, said scan line having a particular uniform radial distance from said rotation axis.

12. The apparatus of claim 10 wherein said at least one optical element is a lens positioned in the path of said radiation beam and said radiation beam scanning means is a rotating optical element rotating about a rotation axis and wherein said lens is positioned between said rotating optical element and said object to be scanned such that said radiation beam is scanned by said rotating optical element thereafter passing through said lens such that a scan line is defined by the focused radiation beam formed by said lens.

13. The apparatus of claim 1 wherein said electronic controller means is carded by said movable carriage means.

14. The apparatus of claim 1 wherein said linear motion drive means comprises:
   (a) a drive shaft supported for rotation with respect to said movable carriage means;
   (b) a DC motor means, mounted to said movable carriage means, for rotating said drive shaft; and,
   (c) a friction wheel mechanically coupled with said drive shaft and in contact with a fixed base to drive said movable carriage means along a motion axis with respect to said fixed base upon rotation of said DC motor means and said drive shaft.

15. The apparatus of claim 14 further comprising:
(a) an inertia flywheel fixed to said drive shaft for rotation therewith;
(b) velocity feedback means for determining the velocity of said movable carriage means with respect to said fixed base; and
(c) DC motor controller means, responsive to said velocity feedback means, for adjusting the rotational velocity of said DC motor means to maintain a desired linear velocity of said movable carriage means with respect to said fixed base.

16. The apparatus of claim 15 further comprising:
(a) position feedback means for determining the position of said movable carriage with respect to said fixed base; and,
(b) position correction means for continuously comparing, the actual position of said movable carriage with respect to said fixed base with, a desired position of said movable carriage with respect to said fixed base and for cooperating with said DC motor controller means to adjust the rotational velocity of said DC motor means to minimize the position error.

17. The apparatus of claim 2 wherein said electromagnetic radiation source means comprises a laser.

18. The apparatus of claim 3 wherein said electromagnetic radiation source means comprises a laser.

19. The apparatus of claim 4 wherein said electromagnetic radiation source means comprises a laser.

20. The apparatus of claim 5 wherein said electromagnetic radiation source means comprises a laser.

21. The apparatus of claim 6 wherein said electromagnetic radiation source means comprises a laser.

22. The apparatus of claim 7 wherein said electromagnetic radiation source means comprises a laser.

23. The apparatus of claim 17 wherein said laser includes a semiconductor laser diode and wherein said means for modulating the energy of said radiation beam includes a semiconductor laser diode driver and wherein said semiconductor laser diode and said semiconductor laser diode driver are carried by said movable carriage means.

24. The apparatus of claim 18 wherein said laser includes a semiconductor laser diode and wherein said means for modulating the energy of said radiation beam includes a semiconductor laser diode driver and wherein said semiconductor laser diode and said semiconductor laser diode driver are carried by said movable carriage means.

25. The apparatus of claim 19 wherein said laser includes a semiconductor laser diode and wherein said means for modulating the energy of said radiation beam includes a semiconductor laser diode driver and wherein said semiconductor laser diode and said semiconductor laser diode driver are carried by said movable carriage means.

26. The apparatus of claim 20 wherein said laser includes a semiconductor laser diode and wherein said means for modulating the energy of said radiation beam includes a semiconductor laser diode driver and wherein said semiconductor laser diode and said semiconductor laser diode driver are carried by said movable carriage means.

27. The apparatus of claim 21 wherein said laser includes a semiconductor laser diode and wherein said means for modulating the energy of said radiation beam includes a semiconductor laser diode driver and wherein said semiconductor laser diode and said semiconductor laser diode driver are carried by said movable carriage means.

28. The apparatus of claim 22 wherein said laser includes a semiconductor laser diode and wherein said means for modulating the energy of said radiation beam includes a semiconductor laser diode driver and wherein said semiconductor laser diode and said semiconductor laser diode driver are carried by said movable carriage means.

* * * * *